United States Patent [19]

Rowell

[11] 4,258,659
[45] Mar. 31, 1981

[54] ANIMAL LITTER AND PROCESS AND STRUCTURE FOR MAKING SAME

[75] Inventor: George W. Rowell, Pine River, Minn.

[73] Assignee: Quality Bedding and Litter, Inc., Minneapolis, Minn.

[21] Appl. No.: 34,342

[22] Filed: Apr. 30, 1979

Related U.S. Application Data

[63] Continuation of Ser. No. 704,127, Jul. 7, 1976, abandoned.

[51] Int. Cl.$^3$ ............................................. A01K 1/015
[52] U.S. Cl. ................................................................ 119/1
[58] Field of Search ...................... 119/1; 209/3, 4, 11, 209/235; 34/137

[56] References Cited

U.S. PATENT DOCUMENTS

| | | | |
|---|---|---|---|
| 977,244 | 11/1910 | Wiebe | 34/137 X |
| 2,179,591 | 11/1939 | Godchaux | 119/1 |
| 3,256,857 | 6/1966 | Karras | 119/1 |

*Primary Examiner*—Hugh R. Chamblee
*Attorney, Agent, or Firm*—Burd, Bartz & Gutenkauf

[57] ABSTRACT

Cat litter comprising soft wood particles that are super dry and have a size range between 0.5 millimeter and 10 millimeters. The litter is made by a process of collecting, drying, separating and packaging wood particles. Waste wood material, as sawdust and wood pieces, made during the sawing of soft wood is taken from sawmills and transported to a processing and packaging installation. The wood material comprises wood particles ranging in size from fine dust to small boards. The wood particles are processed by initially heating all the particles to super-dry the particles. The super dry wood particles are subjected to a fine screening operation where the dust and fine particles are removed. The remaining particles move to a coarse screening operation where the large particles are removed in a two-step screening operation. The intermediate, or litter, particles are deposited in an apparatus for packaging the litter particles in bags. The bagged particles are sold as animal litter.

8 Claims, 3 Drawing Figures

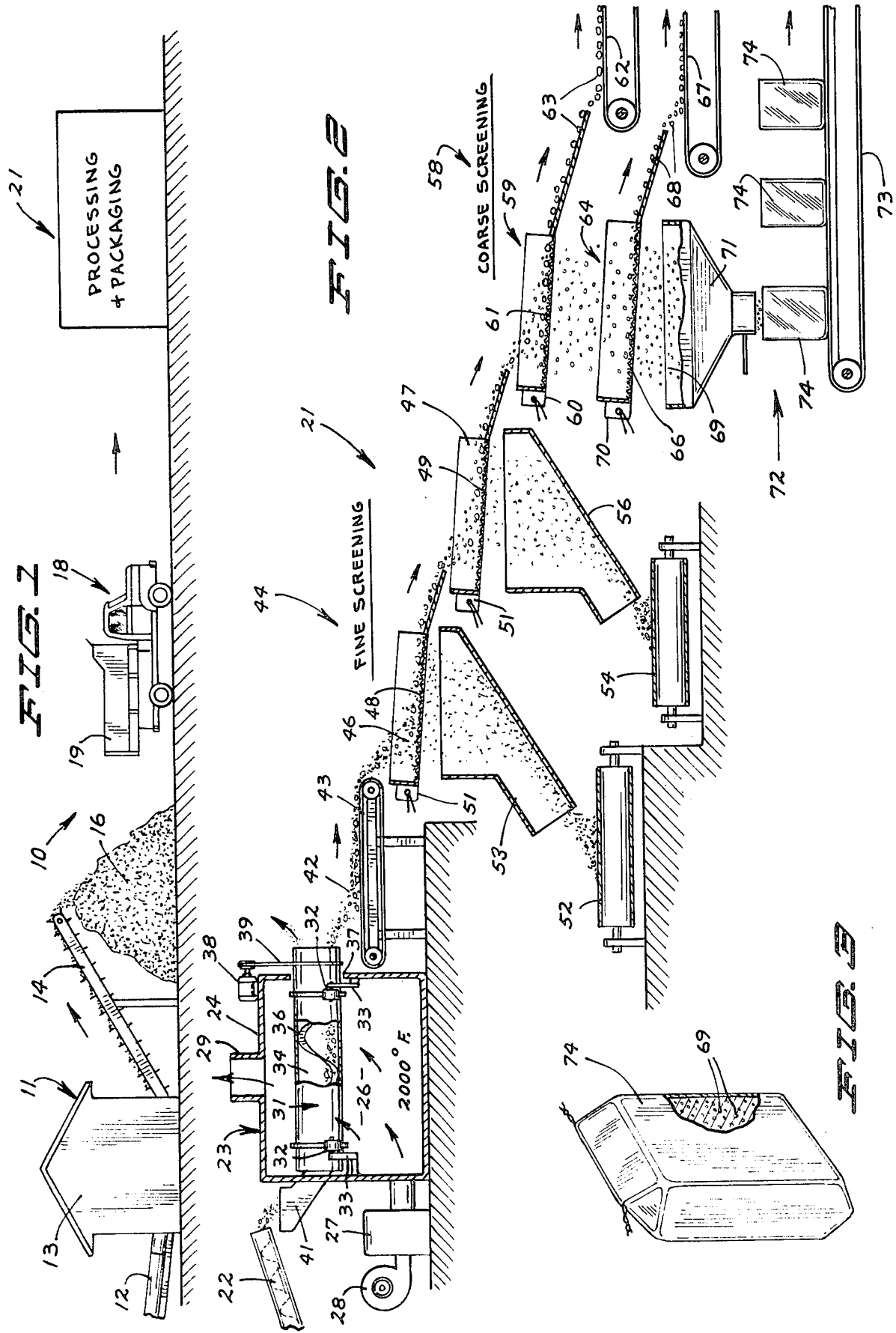

ANIMAL LITTER AND PROCESS AND STRUCTURE FOR MAKING SAME

This Application is a continuation of U.S. application Ser. No. 704,127, filed July 7, 1976, now abandoned.

BACKGROUND OF INVENTION

The conversion of logs into lumber generates waste material in the nature of wood particles, including dust, chips, bark, splinters, and small pieces of wood. This material has limited use as insulation and agricultural mulch. The raw lumber is further processed by planing. Wood shavings from the planing operation are used as animal bedding and litter. Cedar wood shavings are presently available as animal litter. The shavings are relatively thin and curled. They are relatively large and are not particularly suitable for liquid and odor control of animal wastes. While wood shavings are functional to absorb some of the liquid and solid animal wastes, they do not appreciably reduce odors. Feline owners have a special problem with waste absorbtion and odor control. The primary product marketed is a clay base material. When this material absorbs liquid, it breaks down into mud and does not contain or control odors.

SUMMARY OF INVENTION

The invention is directed to a process of collecting, treating and packaging wood particle waste matter to provide animal litter. More particularly, the invention is directed to a process of making cat litter that absorbs moisture and effectively controls odors. The wood particle materials are transported from sawmills to the processing and packaging installation. The wood particles are deposited in a conveyor which moves the particles into a dryer. The dryer has a continuously rotating drum which is subjected to hot air having temperatures reaching 2000° F. Substantially all of the moisture from the wood particles is driven off, making the particles super dry. The dry particles are carried by a conveyor to a fine screening operation. The dry wood particles move over a first screen which removes dust and fine particles. The remaining particles move on to a second screen where larger, but still relatively small, particles are removed. The remaining particles are then transported to a coarse screening operation which is done in two stages. Initially, the larger particles are moved to a first conveyor. The intermediate particles are moved to a second conveyor. The remaining particles are the intermediate size wood particles used as animal litter. These particles are delivered to a hopper or suitable bagging unit. The bagging unit is operable to dispense the particles into shipping and storage bags, such as polyethylene bags.

The invention is also directed to the apparatus for making the animal litter and the resultant animal litter. The apparatus includes a dryer for removing the moisture from the wood particles and the fine and coarse screening means to sequentially separate fine and coarse particles from the litter size particles. The litter particles are super dry, having a moisture content by weight of 5% or less. A majority of the particles., preferably 95% or more, have a length of between 2 millimeters and 6 millimeters and a thickness of between 0.5 millimeter and 2 millimeters.

An object of the invention is to provide a method of making an effective, low cost animal litter from waste wood products that will absorb animal moisture and abate fecal odors. Another object of the invention is to provide a process for making a litter from soft wood particles that is effective in controlling odors from liquids and solids. A further object of the invention is to provide a process and apparatus for handling wood particles and separating the particles according to size so that each size will have a particular utility. A still further object of the invention is to provide animal litter from wood particles that effectively controls animal wastes and odors and is lightweight, clean and easy to handle. Yet another object of the invention is to provide a low cost cat litter comprising softwood particles that control odor, absorb liquids, has a long and effective use, and is biodegradable upon disposal. These and other objects are set out and will become apparent in the following description of the invention.

IN THE DRAWINGS

FIG. 1 is a diagrammatic of a method of collecting, processing and packaging wood particles into animal litter;

FIG. 2 is a diagrammatic view of the processing of wood particles into animal litter; and FIG. 3 is a perspective view, partly sectioned, of a packaged animal litter.

DESCRIPTION OF PREFERRED EMBODIMENT

Referring to FIG. 1, there is shown at 10 a diagrammatic view of collecting, processing and packaging of wood particles into animal litter. A sawmill indicated generally at 11 converts logs 12 into lumber with conventional sawing machinery. During the conversion process, waste materials, as dust, dirt and wood particles are created. The materials are carried from the sawing mechanism by a discharge conveyor 14 to a pile 16. The pile 16 is built up from the ground 17.

The waste materials comprise sawdust, chips, bark, boards, pieces of wood of various sizes, dust, and other foreign matter. The particles range in size from fine dust to pieces of wood having a length of 20 centimeters or more. The particle size is random and includes fine, coarse and intermediate size particles. The waste pile 16 must be periodically moved to provide room for additional bulk materials being discharged by the conveyor 14. This material has found various uses. Sawdust has been compressed into fireplace logs and used in construction materials. Gardeners use sawdust as a mulch and soil conditioning material.

The materials of pile 16 are transported by a vehicle 18, as a truck, having a box 19 to the processing and packaging installation indicated generally at 21. The vehicle 18 can be a trailer or sled having a suitable box for carrying the waste material. The vehicle 18 is used to collect the waste materials from a number of sawmills and carry the material to the processing and packaging installation 21.

Referring to FIG. 2, the processing and packaging installation 21 has a loading conveyor 22 which receives the materials from the vehicle 18. The conveyor 22 is operable to continuously feed the materials to a dryer indicated generally at 23. Dryer 23 has a housing 24 defining a heating chamber 26. Hot air is introduced into chamber 26 with a heater 27 connected to a blower 28. Suitable controls are connected to both the heater 27 and blower 28 to control the amount and temperature of the air in chamber 26. Preferably, the hot air delivered to chamber 26 has a temperature of about 2000° F. Other temperatures can be used to dry the materials.

The housing 24 has an upright tubular stack 29 providing an outlet for the hot air moving through chamber 26.

A horizontal tubular drum indicated generally at 31 is located in chamber 26. Drum 31 is supported on pairs of rollers 32. Arms 33 secured to housing 24 support the rollers and drum in a generally horizontal position in the upper part of chamber 26. Drum 31 has a horizontal passage 34 through which the materials flow during heating. Secured to the inside of drum 31 are a plurality of spiral ribs or blades 36 which facilitate movement of the materials through passage 34 on rotation of drum 31. The rear section of drum 31 projects through a hole 37 in the side wall of housing 24. The drum 31 is rotated with a motor 38. A belt of chain drive 39 connects the motor 38 with the drum 31 whereby, on operation of the motor 38, the drum 31 will rotate. Other drive structures can be used to rotate drum 31. An inlet hopper 41 is secured to the side wall of housing 24. Hopper 41 has an open top for receiving the materials from conveyor 22 and is operable to deliver the materials to the inlet end of drum 31.

On operation of motor 38, the drum 31 rotates to continuously move the material through the passage 34 of drum 31. The materials continuously flow through dryer 23 and are subjected to sufficient heat for 2 to 3 minutes so that substantially all of the moisture is driven from the materials. The materials 42 discharged from drum 31 are in a super dry condition. The materials 42 are discharged from drum 31 onto an endless conveyor 43. Conveyor 43 is operable to continuously move the materials 42 to a fine screening apparatus 44 where the very fine wood particles, dirt and dust are removed.

The fine screening apparatus 44 has two screening units 46 and 47. Unit 46 has an 8 mesh screen 48 and unit 47 has a 14 mesh screen 49. Each screening unit 46 and 47 has a vibrator 51 operable to vibrate and reciprocate the screens so that the materials 42 move over the screens 48 and 49, with the dust and smaller particles falling through the screens. The material from screening unit 46 is delivered to a conveyor 52 via a delivery chute 53. The fine material passing through screen 49 is delivered to a conveyor 54 via a chute 56. The remaining material on top of unit 47 is delivered to a coarse screening apparatus indicated generally at 58. This material comprises wood particles having a thickness of more than 0.5 millimeter.

Coarse screening aparatus 58 has a pair of screening units 59 nd 64 for removing the larger wood particles in two steps. First screening unit 59 has a screen 61 operable to separate the coarse particles 63 from the intermediate particles 68. The coarse particles 63 are delivered to a discharge conveyor 62. The intermediate particles 68 are deposited on a second screening unit 64. Screening unit 64 has a screen 66, preferably 6 mesh, to separate the larger particles 68 from the litter size particles 69. The larger particles 68 are delivered to an out conveyor 67.

Screening unit 59 has a vibrator 60 operable to continuously move the particles along the screen 61. A similar vibrator 70 forms part of the second screening unit 64 and operates to move the particles over the screen 66 to insure that the litter particles flow through the screen 66 into a hopper 71. As the particles 69 move over screens 48, 49 and 61 and through screen 66, the edges become smooth and rounded. The abrasion of the particles on each other and the wires of the screen removes the edges and sharp corners from the particles. The smooth particles are free flowing and do not adhere or cling to animal hair.

Hopper 71 is part of a bagging apparatus indicated generally at 72. Bagging apparatus 72 includes a conveyor 73 operable to carry open top bags 74 under the hopper 71 so the bags 74 can be filled with the wood particles. The filled bags 74 are then closed, making them ready for storage and shipment to the consumer. Other types of packaging machines can be used to place the litter sized particles in bags or other containers.

FIG. 3 illustrates a closed bag 74. The bag material is preferably polyethylene film. The wood particles 69 have irregular shapes and relatively uniform sizes. The litter particles are free of dust and larger particles. The irregular shapes of the particles provides large surface areas. The particles are extremely dry, as substantially all of the moisture has been removed with dryer 23. A substantial part of particles 69 have a length of between 2 millimeters and 6 millimeters. Some particles have a length up to 20 millimeters. Particles 69 have a thickness of between 0.5 millimeter and 2 millimeters. The sequential screening steps smooth and round the edges and ends of particles 69. This enhances the free flowing ability of the particles, making the litter easy to handle.

Dryer 23 removes substantially all of the moisture from the wood particles. Particles discharged from dryer 23 have a low moisture content, preferably less than 5% by weight. The moisture content of the particles 69 may be in the range of 2% to 10% by weight. The particles 69 are particularly suitable as a cat litter. In use, the particles are clean and do not adhere to cat hair. Because the particles are super dry, they effectively control cat odors, liquids and solids. The liquids are quickly absorbed by the particles and the odor gas molecules are retained by adhesion, molecular attraction and other odor captive mechanisms.

The bag material forms a vapor barrier so that the particles 69 will not absorb any appreciable moisture during storage prior to sale and use by the ultimate consumer. Examples of the types of litter material are white pine, red pine, jack pine, Norway pine and the like having a length range of between 2 millimeters and 6 millimeters and a moisture content of less than 5%. These particles are packaged in polyethylene bags and marketed as cat litter.

The embodiments of the invention in which an exclusive property or privilege is claimed are defined as follows:

1. An apparatus for making animal litter from wood particles having random sizes including fine size, intermediate size, and coarse size particles comprising: dryer means having a housing, said housing having spaced generally upright first and second side walls and a heating chamber, said second side walls having a hole, drum means having a passage for accommodating wood particles and an inlet end and an outlet end in communication with said passage, said inlet end being located adjacent said first side wall, said outlet end projected through the hole in the second side wall, means mounted on the first and second side walls of the housing rotatably supporting the drum means in the heating chamber for rotation about the longitudinal axis of the drum means, drive means mounted on the housing for rotating the drum means about the longitudinal axis thereof, hopper means mounted on the first side wall for directing wood particles into the inlet end of the passage of the drum means, said wood particles on rotation of the drum means about the longitudinal axis thereof moving through said passage to the outlet end thereof, means for supplying heated gas to said heating chamber to dry the wood particles moving through said passage of the drum means, first screening means for receiving dry wood particles from the outlet end of the drum means and for separating fine size wood particles from coarse size and intermediate wood particles, second screening means for receiving the intermediate and coarse size wood particles from the first screening means and for separating the intermediate size wood particles from the coarse size wood particles, and means for collecting the intermediate size particles separated from the second screening means for use in animal litter.

2. The apparatus of claim 1 wherein: said housing has a top wall having a hole providing an outlet for the hot gas moving through the heating chamber.

3. The apparatus of claim 1 wherein: the second screening means comprises a first screen and second screen, said second screen located to receive particles from the first screen and deliver intermediate size particles to the means for collecting the intermediate size particles.

4. The apparatus of claim 1 wherein: the first screen means comprises a first screen and second screen, said second screen located to receive particles from the first screen whereby the first and second screens operate to separate the fine size particles from the intermediate and coarse size particles in two steps, said screening means comprising a third screen and fourth screen, said fourth screen located to receive particles from the third screen and deliver intermediate size particles to the means for collecting the intermediate size particles.

5. The apparatus of claim 1 wherein: said drum means includes means in the passage to facilitate movement of particles through the passage.

6. The apparatus of claim 5 wherein: the means in the passage comprise a plurality of spiral ribs.

7. The apparatus of claim 1 wherein: the first screening means comprises a first screen and second screen, said second screen located to receive particles from the first screen whereby the first and second screens operate to separate the fine size particles from the intermediate and coarse size particles in two steps.

8. The apparatus of claim 7 wherein: the first screen is a 14 mesh screen and the second screen is an 8 mesh screen.

* * * * *